United States Patent

[11] 3,581,850

| [72] | Inventor | Horst Jaitl |
| | | Schweinfurt Am Main, Germany |
| [21] | Appl. No. | 807,342 |
| [22] | Filed | Mar. 14, 1969 |
| [45] | Patented | June 1, 1971 |
| [73] | Assignee | Fichtel and Sachs AG |
| | | Schweinfurt am main, Germany |
| [32] | Priority | Mar. 21, 1968 |
| [33] | | Germany |
| [31] | | P.17 50 021.9 |

[54] VALVE FOR SHOCK ABSORBERS
9 Claims, 3 Drawing Figs.

[52] U.S. Cl. ............................................. 188/322
[51] Int. Cl. ............................................. F16f 9/34
[50] Field of Search ........................... 188/88.501,
88.504, 88.505, 96.5, 96.51, 96.52, 100, 100 P,
100 AF

[56] References Cited
UNITED STATES PATENTS

| 2,702,398 | 2/1955 | Marcus | 188/96(.52)X |
| 3,302,756 | 2/1967 | McIntyre | 188/88(.504) |

FOREIGN PATENTS

| 1,408,482 | 7/1965 | France | 188/100 |
| 750,522 | 6/1956 | Great Britain | 188/88(501) |
| 751,164 | 6/1956 | Great Britain | 188/100 |

Primary Examiner—George E. A. Halvosa
Attorney—Low and Berman

ABSTRACT: The noise resulting from the opening and closing of a check valve in a shock absorber, hydropneumatic spring, or similar suspension element is eliminated or sharply reduced by the insertion of a porous plug into a duct leading to the movable valve member or to the valve seat.

INVENTOR
Horst Jaitl
By: Low and Berman
AGENTS

VALVE FOR SHOCK ABSORBERS

BACKGROUND OF THE INVENTION

This invention relates to hydraulic, pneumatic, or hydropneumatic suspension elements commonly used in motor vehicles, but finding also other applications, and particularly to an improved valve arrangement in such an element.

Many suspension elements of the type described rely for operativeness on a valve arrangement including a valve seat and a valve member provided in a duct which connects two fluid-filled chambers in the shell of the suspension element. The valve arrangement operates automatically in response to the movement of a piston of the element in a cylinder to open or close the duct.

The movement of the valve member relative to the valve seat is rather sudden in the known suspension elements, and is frequently accompanied by noise loud enough to be irritating. The loudness of the noise is directly related to the pressure differential between the connected chambers, and the differential may substantially exceed design values when the valve sticks, and opens with a delay.

The primary object of the instant invention is a modified valve arrangement which is noiseless or practically noiseless in its operation, yet not significantly more complex nor more costly than the known, potentially noisy valves.

SUMMARY OF THE INVENTION

With these and other objects in view, the invention in one of its basic aspects provides a divider arrangement in a portion of the valved duct to divide the same into a multiplicity of passages having each an effective flow section which is but a very small fraction of the effective flow section of the remainder of the duct.

The divider arrangement may consist of a porous, unitary plug member of sintered bronze or the like filling the divided duct portion and having pores which occupy approximately 30—40 percent of the overall apparent volume of the plug member. The pores, if approximately circular in cross section, should have a diameter transversely to the direction of fluid flow of 25 to 200 $\mu$m., and the flow sections of the passages constituted by the pores should correspond to those of cylindrical tubes having an internal diameter of 25 to 200 $\mu$m.

The lower end of this range gives the best results under most conditions, and the preferred pore size or effective flow section diameter is 25 to 50 $\mu$m.

Suitable plugs may also be made at even smaller expense from wads of metal or plastic fibers similar in porosity to the aforedescribed unitary plug member. The plugs can be installed at an orifice of a valved duct in one of the connected chambers in most existing suspension elements of the type described, and are readily secured by a press fit. A plug of the invention may be further secured by a flange abutting from the outside against a chamber wall surrounding the duct orifice.

Other features as well as the attending advantages of this invention will readily become apparent from the following detailed description of a preferred embodiment of the invention, when considered in connection with the appended drawing.

DESCRIPTION OF THE PREFERRED EMBODIMENT

Figure 1:
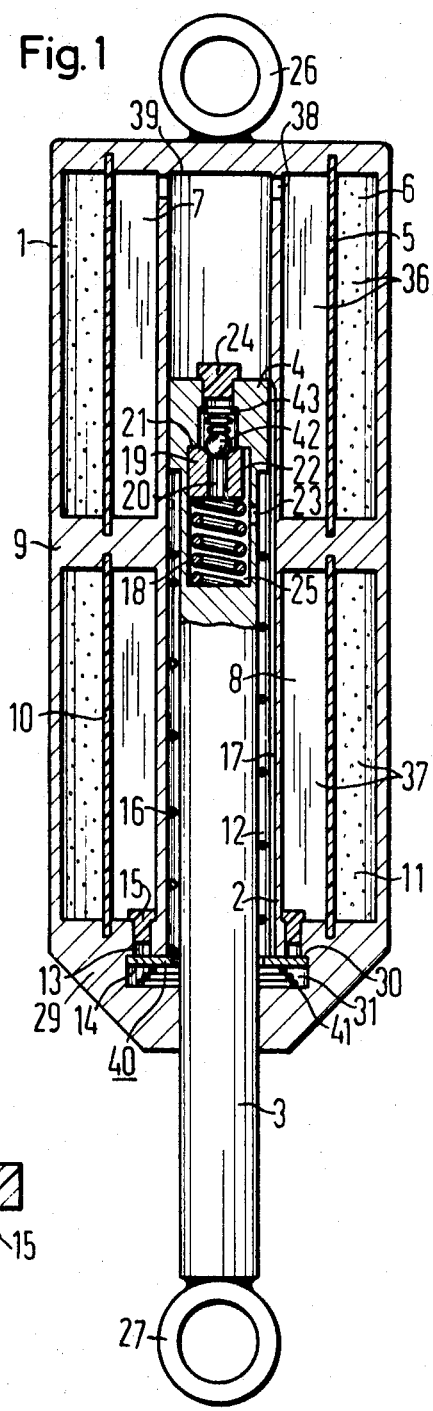
FIG. 1 shows a hydropneumatic suspension element equipped with a valve arrangement of the invention in elevational section.

The hydropneumatic shock absorber shown in FIG. 1 has an outer cylindrical shell 1 whose two axial ends are provided respectively with a fixed, sealed cover 39 and a fixed, annular, transverse wall 29. A cylinder 2 coaxially with the shell 1 is fixedly arranged between the cover 39 and the wall 29. A piston rod 3 moves axially through the wall 29 in sealing engagement, and its inner end carries a piston 4 of an outer diameter equal to the inner diameter of the cylinder 2.

The annular space between the cylinder 2 and the shell 1 is axially divided into two approximately equal halves by a fixed, radial partition 9. The upper half 36 of this space is divided by a cylindrical, resilient membrane 5 into an outer, sealed chamber 6 filled with compressed air or nitrogen and an inner chamber which communicates through radial bores 38 in the cylinder 2 near the cover 39 with the working compartment 7 of the element in the cylinder 2 above the piston 4, and is practically an integral part of that compartment.

The annular space 37 below the partition 9 is divided by a cylindrical resilient membrane 10 into an outer, sealed, normally gas-filled chamber 11 and an inner storage chamber 8.

An annular pumping compartment 12 extends radially between the piston rod 3 and the cylinder 2 below the piston 4. It communicates axially with an annular chamber 31 in the wall 29 about the piston rod 3. A downwardly directed shoulder of the wall 29 and an annular, lower end face of the cylinder 2 provide a valve seat 30 for a flat annular valve disc 14 pressed against the valve seat 30 by a compression spring 41 coiled about the piston rod 3 in the chamber 31. Axial bores 13 in the wall 29 and the chamber 31 jointly constitute a duct 40 which connects the storage chamber 8 with the pumping compartment 12, and is normally closed by the valve disc 14 which circles the piston rod 3 with ample clearance to permit fluid flow therebetween, but seals the orifices of the bores 13 in the valve seat 30.

A strong helical compression spring 16 coaxially surrounds the piston rod 3 in the pumping compartment 12. It rests on the inner rim of the valve disc 14, and its upper axial end is located on the approximate level of the partition 9, and well below the piston 4 in the illustrated position of the latter. An axial groove 17 in the inner wall of the cylinder 2 extends over the length of the pumping compartment 12, but is prevented by the piston 4 from communicating with the working compartment 7.

A bore 25 of stepped cylindrical shape extends inward from the radial face of the piston 4 in the working compartment 7 and into the piston rod 3. A helical compression spring 18 abuts against the bottom of the bore 25 and normally holds a tubular valve seat member 19 against a shoulder 21 of the piston 4 in the bore 25. The central, axial passage 20 of the valve seat member 19 is normally closed by a spherical valve member 42 held in position by a valve spring 43. The portion of the bore 25 below the valve seat member 19 is connected with the pumping compartment 12 by a radial bore 23 in the piston rod 3, and the valve seat member 19 has an axial recess 22 extending over its entire length.

Eyes 26, 27 normally fasten the shell 1 and the piston rod 3 to the sprung and unsprung masses of a vehicle, such as a motorcar.

Figure 2:
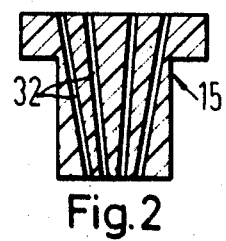
FIG. 2 shows a plug of the device of FIG. 1 in enlarged section.

This invention is more specifically concerned with flanged plugs 15 in the orifices of the bores 13 in the storage chamber 8 remote from the valve and with a similar, but somewhat bigger plug 24 which extends into the orifice of the bore 25 remote from this spherical valve member 42 from the working compartment 7. Each of these plugs consists of bronze powder sintered into a unitary, porous body, as illustrated in FIG. 2 with specific reference to one of the plugs 15. Connected pores form capillary passages 32 through the plug 15. While the flow section of each passage 32 is only an infinitesimally small fraction of the bore 13, the combined flow sections of the passages 32 are within an order of magnitude of the flow section of the bore 13.

Sintered bodies of powder bronze are staple articles of commerce available in a wide range of pore sizes and pore volumes and are readily machined or pressed to shape. Extended tests have shown that the desired noise abatement is achieved most effectively with a pore volume of 30 to 40 percent of the apparent overall volume of the bronze body, and with passages 32 whose flow section corresponds to that of a cylindrical tube having an internal diameter of 25 to 200 μm., and preferably 25 to 50 μm. The pores of commercial sintered bronze powder bodies are sufficiently similar to a circle in cross section to provide such flow sections with pores of 25 to 200 μm., or 25 to 50 μm. diameter.

Figure 3:
FIG. 3 illustrates a modified plug in a view corresponding to that of FIG. 2.

With some experimentation, wads of steel wool, copper wool, monofilament plastic fibers, and the like fibrous material can be compressed to have similar flow characteristics as the sintered bronze plugs described above, and such a plastic wool plug 33 is shown in FIG. 3. It may replace the bronze plugs 15,24 shown in FIG. 1 in an obvious manner.

The operation of the illustrated apparatus is inherent in the illustrated structure, and known in itself except as influenced by the plugs 25,24.

Except for the sealed chambers 6,11 which contain a gas under a pressure much higher than atmospheric pressure, the shell 1 is entirely filled with a practically noncompressible liquid, such as oil, when in operation. In the normal position of the piston 4 on the level of the partition 9, the piston rod 3 is pushed into the cylinder 2 under an increase in static or dynamic load, thereby compressing the gas in the chamber 6, and is returned to the illustrated position when the load is reduced to the previous level. There is no flow of liquid through the valves in the piston 4 and the wall 29, but liquid flows through the narrow groove 17 between the compartments 7 and 12.

When the piston 4 is pushed upward into and beyond the illustrated position by an unusually heavy load, the groove 17 is blocked, the pressure in the working compartment 7 is permanently raised, and that in the pumping compartment 12 is lowered until liquid is caused to flow from the storage chamber 8 into the pumping compartment through the capillary passages of the plugs 15 and the bores 13, lifting the disc 14. During subsequent outward movement of the piston rod 3 from the cylinder 2, which does not cause an opening of the groove 17, the disc 14 is returned to the seat 30, and liquid is pushed through the bores 23, 25 into the working compartment 7, lifting the spherical valve member 42 from the seat member 19.

When the pressure in the working compartment 7 exceeds a safe design limit, the valve seat member 19 is pushed downwardly away from the shoulder 21 against the restraint of spring 18, and liquid is returned to the pumping compartment 12, bypassing the closed axial passage 20 in the member 19. No further liquid can be pumped into the working compartment.

A substantial reduction in the load applied to the illustrated suspension element causes the piston rod 3 to move outward of the cylinder 2 until the piston 4 engages the spring 16 and moves the valve disc 14 away from the orifices of the bores 13 so that liquid is returned to the storage chamber 8 from the compartments 12, 7, and the piston 4 is shifted toward its normal position.

The liquid flowing through the ducts 25 or 40 during the aforedescribed operation of the suspension element while the valves are open is divided by the plugs 15,24 into numerous minute streams in which liquid flow is predominantly laminar, and which can be interrupted without shock or noise. The throttling effect of the plugs is immaterial to the functioning of the suspension element.

The plugs of the invention which are somewhat resilient can readily be installed in existing suspension units by inserting the plugs in available orifices until the flange abuts against a surface surrounding the orifice. No other structural modifications are required.

I claim:

1. In a suspension element having a shell including a cylinder member, a piston member movable in said cylinder member, a piston rod member outwardly projecting from said shell, fastening means for fastening said piston rod member and said shell to structures to be connected by the suspension element, the shell defining a plurality of chamber therein, fluid substantially filling said chambers, and valve means responsive to movement of said piston member in said cylinder member for connecting and disconnecting two of said chambers, the valve means including a duct having two orifices respectively communicating with said chambers, a valve seat in said duct, and a valve member movable toward and away from a position of sealing engagement with said seat, the improvement in the valve means which comprises:
   a. a plug member substantially filling a portion of said duct spaced from said valve member,
   b. said plug member enclosing pores jointly constituting a multiplicity of passages through said plug member,
   c. the effective flow section of each of said passages corresponding to that of a cylindrical tube having an internal diameter of 25 to 200 μm. and being but a small fraction of the effective flow section of the remainder of said duct,
   d. the length of each passage being much greater than said diameter and sufficient to make liquid flow therein predominantly laminar.

2. In a suspension element as set forth in claim 1, yieldably resilient means normally keeping said valve member in said position of sealing engagement with a force insufficient to prevent movement of the valve member away from said seat when said piston member moves in one direction in said cylinder member, the valve member being further kept in said position thereof by fluid pressure when said piston member moves in said cylinder member in a direction opposite to said one direction.

3. In a suspension element as set forth in claim 1, said pores amounting to approximately 30 to 40 percent of the overall apparent volume of said plug member.

4. In a suspension element as set forth in claim 3, said plug member consisting essentially of sintered bronze.

5. In a suspension element as set forth in claim 3, said plug member consisting essentially of plastic or metal fibers.

6. In a suspension element as set forth in claim 1, said plug member being conformingly received in said portion of said duct, the pores constituting said passages having a diameter transversely to the direction of flow of 25 to 200 μm.

7. In a suspension element as set forth in claim 6, said portion of the duct being one of said orifices.

8. In a suspension element as set forth in claim 6, said diameter being 25 to 50 μm.

9. In a suspension element as set forth in claim 8, a flange on said plug member outside said duct in one of said chambers.